United States Patent
Liang et al.

(10) Patent No.: US 6,485,678 B1
(45) Date of Patent: Nov. 26, 2002

(54) WEAR-RESISTANT IRON BASE ALLOYS

(75) Inventors: Xuecheng Liang, Green Bay, WI (US); Gary R. Strong, Menominee, MI (US)

(73) Assignee: Winsert Technologies, Inc., Marinette, WI (US)

( * ) Notice: Subject to any disclaimer, the term of this patent is extended or adjusted under 35 U.S.C. 154(b) by 0 days.

(21) Appl. No.: 09/596,964

(22) Filed: Jun. 20, 2000

(51) Int. Cl.$^7$ .................. C22C 38/22; C22C 38/30; C22C 38/40; C22C 30/00
(52) U.S. Cl. ............... 420/37; 420/38; 420/67; 420/52; 420/105; 420/107; 420/108; 420/583; 420/584.1; 420/585; 420/586.1; 75/245; 75/246; 75/255
(58) Field of Search ................. 420/37, 38, 67, 420/52, 105, 107, 108, 583, 584.1, 585, 586.1; 75/245, 246, 255

(56) References Cited

U.S. PATENT DOCUMENTS

| | | |
|---|---|---|
| 1,556,776 A | 10/1925 | Flietermann |
| 1,729,245 A | 9/1929 | Chace |
| 1,759,477 A | 5/1930 | Armstrong et al. |
| 1,760,326 A | 5/1930 | Stäblein |
| 1,818,054 A | 8/1931 | Elmen |
| 1,876,411 A | 9/1932 | Gregg et al. |
| 2,099,509 A | 11/1937 | Blessing |
| 2,136,946 A | 11/1938 | McCurdy |
| 2,602,736 A | 7/1952 | Sheridan et al. |

(List continued on next page.)

FOREIGN PATENT DOCUMENTS

| | | |
|---|---|---|
| DE | 1142002 B | 1/1963 |
| DE | 2913221 A1 | 10/1980 |

(List continued on next page.)

OTHER PUBLICATIONS

Strong G. (Winsert) Database Metadex 'Online! Materials Information, The Institute of Metals, London, GB; "Iron-base alloy replaces cobalt in auto engines." Retrieved from STN Database accession No. 61–115 XP 002183696, abstract; from Advanced Materials & Processes (1999) 156, (4), 67–68.

(List continued on next page.)

*Primary Examiner*—Deborah Yee
(74) *Attorney, Agent, or Firm*—Steven P. Shurtz; Brinks Hofer Gilson & Lione

(57) ABSTRACT

A unique iron base alloy for wear resistant applications, characterized in one aspect by its hardening ability when exposed to a certain temperature range, is useful for valve seat insert applications. The alloy also possesses excellent wear resistance, hot hardness and oxidation resistance. The alloy comprises less than 0.1 wt % carbon; about 18 to about 32 wt % molybdenum, about 6 to about 15 wt % chromium, about 1.5 to about 3% silicon, about 8 to about 15 wt % cobalt and at least 40% iron, with less than 0.5 wt % nickel. In another aspect, for lower temperature applications, the cobalt is optional, the nickel content can be up to 14 wt %, but the molybdenum must be in the range of about 29% to about 36%. In one further aspect, for higher temperature applications, the cobalt is optional, but may be used up to 15 wt %, nickel must be used at a level of between about 3 and about 14 wt %, and the molybdenum will be in the range of about 26 to about 36 wt %.

20 Claims, 2 Drawing Sheets

U.S. PATENT DOCUMENTS

| | | |
|---|---|---|
| 3,257,178 A | 6/1966 | Severns et al. |
| 3,361,560 A | 1/1968 | Severns et al. |
| 3,404,999 A | 10/1968 | Tanzman et al. |
| 3,410,732 A | 11/1968 | Smith |
| 4,155,754 A | 5/1979 | Lynn |
| 4,711,826 A | 12/1987 | Shapiro et al. |
| 4,778,522 A | 10/1988 | Maki et al. |
| 4,810,464 A | 3/1989 | Szereto et al. |
| 4,844,024 A | 7/1989 | Fuiki et al. |
| 4,933,008 A | 6/1990 | Fujiki |
| 5,292,382 A | 3/1994 | Longo |
| 5,674,449 A | 10/1997 | Liang et al. |
| 6,200,688 B1 | 3/2001 | Liang et al. |

FOREIGN PATENT DOCUMENTS

| | | |
|---|---|---|
| DE | 3221884 A1 | 5/1983 |
| DE | 3941028 A1 | 8/1990 |
| EP | 0 028 213 | 5/1981 |
| EP | 0223202 A | 5/1987 |
| FR | 1070903 A | 8/1954 |
| GB | 373690 A | 6/1932 |
| GB | 1105218 A | 3/1968 |
| GB | 2128633 A | 5/1984 |
| JP | 53-112206 | 9/1978 |
| JP | 56-158843 | 12/1981 |
| JP | 57 203753 | 12/1982 |
| JP | 58-073750 | 5/1983 |
| JP | 57-134295 | 8/1992 |
| JP | 09 209095 | 8/1997 |
| JP | 10 102220 | 4/1998 |
| WO | WO 81/01156 | 4/1981 |
| WO | WO 00/75390 A1 | 12/2000 |

OTHER PUBLICATIONS

Strong, G. (Winsert) et al Database Metadex 'Online! Materials Information, The Institute of Metals, London, GB; "A review of valve seat insert material properties required for success." Retrieved from STN Database accession No. 31–5911 XP 002183697, abstract, from ASM International. Member/Customer Service Center, Materials Park, OH 44073–0002, USA. 1997. 121–127, Conference: Valvetrain System Design and Materials, Dearborn, MI USA, Apr. 14–15, 1997.

Strong, G. (Winsert); "Iron–base alloy replaces cobalt in auto engines." Advanced Materials & Processes vol. 156 No. 4, Oct. 1999, (reprint).

Strong, G. et al "A Review of Valve Seat Insert Material Properties Required for Success", pp. 121–127, in Proceedings of the International Syposium on Valvetrain System Design and Materials, Apr. 14–15, 1997.

Xuecheng Liang et al., Recent Developments in Valve Seat Insert Alloys, *SAE Technical Paper Series*, Sep. 14, 1998.

"Alloys For Truck Engines," *Machine Design* reprint (3 pages) Oct. 21, 1999.

"New Alloys Hold Future for Winsert," *Diesel Progress, North American Edition*, reprint (2 pages) Feb. 2000.

WEAR-RESISTANT IRON BASE ALLOYS

BACKGROUND OF THE INVENTION

The present invention relates to iron base alloys with improved wear resistance and hot hardness, and also relates to iron base alloys containing primary intermetallic compounds as hard phases. Such alloys are particularly useful for internal combustion engine components, such as valve seat inserts, etc. In a further aspect, this invention relates to components made from such alloys, either cast or hardfaced. An example is a hardfacing for a valve for an internal combustion engine. Alternatively, components made of such alloys may be made by conventional powder metallurgy methods, either by cold pressing and sintering, or by hot pressing at elevated pressures for wear resistant applications.

The development of dry fuel internal combustion engines and tighter emission standards for diesel fuel internal combustion engines require better wear resistant alloys for valve seat insert applications. M2 tool steel (by AISI designation) and high carbon, high chromium type steels are commercially available alloys for valve seat inserts. However, often these alloys experience severe wear in such applications. Stellite® and cobalt base Tribaloy® are alternative alloys used in these situations in the industry.[1] Unfortunately, these alloys are expensive due to the high cost of the cobalt included in the alloys.

[1] ®Registered Trademark of Deloro Stellite Company Inc.

Increasing the hardness of iron base alloys can effectively improve wear resistance of valve seat inserts in many instances. However, this approach also increases machining difficulties and therefore manufacturing cost of valve seat inserts. It would be desirable to have an alloy that increases its hot hardness and wear resistance at working conditions, to avoid machining difficulties associated with conventional high hardness alloys.

Many patents disclose alloy steel or tool steel-type iron base alloys for wear resistant applications. U.S. Pat. Nos. 4,778,522 and 4,844,024 disclose a few examples of tool steel-type wear resistant alloys, where a certain amount of carbon is required to form alloy carbides for better wear resistance. Therefore, carbon is an essential element and is normally higher than 0.1 wt % in these alloys.

U.S. Pat. Nos. 3,257,178, 3,361,560 and 3,410,732 disclose another type of wear resistant alloys which include intermetallic compounds, such as Laves phase, as hard phases for wear resistant applications. Many alloy systems, such as W—Ni—Si, Mo—Ni—Si, W—Co—Si and Mo—Cr—Ni—Si, were tested as protective coatings (U.S. Pat. No. 3,257,178). Cobalt base alloys, composed of 14–30 wt % molybdenum, 6–12 wt % chromium, 0.54 wt % silicon, and at least 50 wt % cobalt, are disclosed in U.S. Pat. No. 3,410,732.

U.S. Pat. No. 4,933,008 discloses sintered iron base alloys comprised of a high speed tool steel matrix powder and a hard alloy powder. The two types of powders were mixed and sintered to form wear resistant alloys. The hard alloys are composed of 0.02–0.2 wt % carbon, 3–30 wt % silicon, 0.05–0.7 wt % manganese, 10–60 wt % molybdenum, 1–7 wt % titanium, 0.5–2 wt % boron, 1.0–10 wt % nickel, and the balance being iron and impurities. Japanese Patent Publication No. 53-112206 discloses additional sintered iron base alloys with additions of 540 wt % of hard alloy to increase wear resistance of the powder metallurgy alloy. The hard alloys have the following chemical compositions: less than 0.01 wt % carbon, 0.5–1.0 wt % silicon, less than 0.4 wt % manganese, 10–50 wt % molybdenum, and less than 40 wt % combined total of nickel, chromium and/or cobalt.

These last two references describe the method of making the alloys by adding a certain amount of hard alloy powder to a matrix alloy to make wear resistant materials through a powder metallurgy process. The powder metallurgy process makes it possible to use high molybdenum (up to 50 wt %) and high silicon (up to 30 wt %) to form very fine alloy particles without a cracking problem. However, it is very difficult for conventional casting methods to use such compositions as casting alloys to produce engine components, because silicon and molybdenum contents in such high levels make the components extremely brittle.

It would be beneficial if an iron-based composition could be developed for internal combustion engine components because it would have a low cost compared to nickel and cobalt alloys. An intermetallic-type iron base casting alloy for wear resistant application is thus highly desirable. An alloy with precipitation hardening ability at exhaust working temperatures to improve the service life of valve seat inserts would be a further significant improvement.

SUMMARY OF THE INVENTION

Iron base alloys have been invented that have good wear resistance. One aspect of the invention includes alloys that have a unique feature of hardening when exposed to working temperatures of exhaust valve seat inserts, which in turn improves wear resistance and hot hardness of the alloys. The hardening of the alloys is achieved through controlling chemical compositions of the alloys to promote precipitation of secondary intermetallic compounds at relatively low temperatures. The alloys also have high sliding wear resistance and high hardness at elevated temperatures, and the cost of the alloys is significantly lower than commercially available cobalt base alloys, such as Stellite® and Tribaloy®. In one aspect, the present invention is an alloy with the following composition:

| Element | wt. % |
|---|---|
| Carbon | less than 0.1 |
| Silicon | 1.5–3 |
| Chromium | 6–15 |
| Molybdenum | 18–32 |
| Cobalt | 8–15 |
| Nickel | less than 0.5 |
| Iron | at least 40. |

Optionally, the inventive alloys do not need to contain cobalt when they are to be used for applications where the working temperature is too low to generate any hardening effect in the alloy, such as 600° F. (316° C.). For this use, the inventive alloys preferably have the following composition:

| Element | Wt. % |
|---|---|
| Carbon | less than 0.1 |
| Silicon | 1.5–3 |
| Chromium | 6–15 |
| Molybdenum | 29–36 |
| Cobalt | 0–15 |
| Nickel | 0–14 |
| Iron | at least 40. |

Further optionally, the inventive alloys contain nickel in an amount of 3–14 wt % to totally or partially replace cobalt for applications where the working temperature is too high (over 1000° F.) (538° C.) to keep the hardening effect promoted by cobalt in the alloy. Under such conditions, molybdenum content should be limited to 26–36 wt % in order to achieve maximum wear resistance of the inventive alloys. In this aspect, the preferred inventive alloys have the following composition:

| Element | Wt. % |
|---|---|
| Carbon | less than 0.1 |
| Silicon | 1.5–3 |
| Chromium | 6–15 |
| Molybdenum | 26–36 |
| Cobalt | 0–15 |
| Nickel | 3–14 |
| Iron | at least 40. |

In another aspect of the invention, metal components are either made of the alloys, such as by casting, or using powder metallurgy methods, such as by forming the component from a powder and sintering. Furthermore, the alloys may be used to hardface components as a protective coating.

DETAILED DESCRIPTION OF THE DRAWINGS AND PREFERRED EMBODIMENTS OF THE INVENTION

Figure 1:
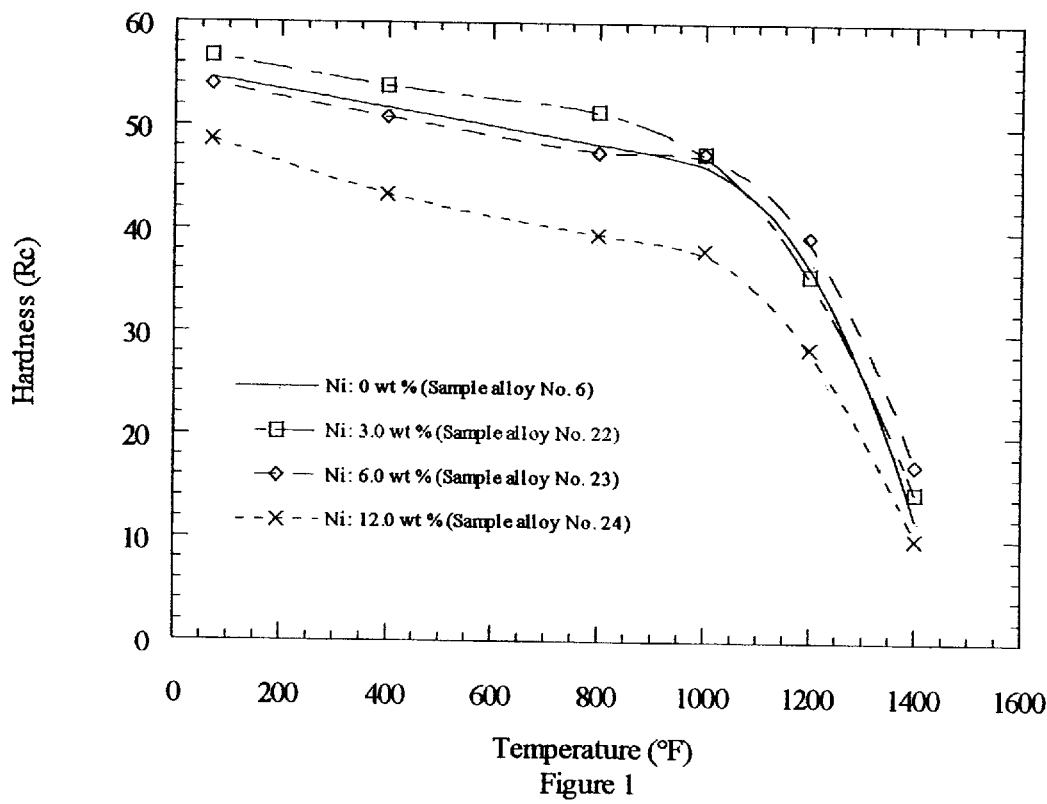
FIG. 1 is a graph showing the effect of nickel content on hot hardness of sample alloys of the invention.

The alloys of the present invention are homogenous iron base alloys, rather than composite alloys made from two or more different fractions. The alloys are made by melting all of the components together. The alloys can then be cast into parts, used to hard face parts, or the solidified alloy can be used to make parts from powdered metallurgy processes.

In the homogenous alloy, intermetallic compounds form as the melt cools. However, these are still considered to be homogenous alloys. The intermetallic compounds are utilized to improve the wear resistance of the inventive alloys. The hardness of the intermetallic compounds, normally around 1100–1400 kg/mm$^2$ under Knoop hardness test, is slightly higher than the hardness of the matrix but much lower than the hardness of alloy carbides found in common wear resistant steels. The intermetallic compounds in the alloys have a hexagonal structure that is normally believed to have a low frictional coefficient when the lattice ratio (c/a) of the hexagonal structure is in a proper range. The relatively low hardness and hexagonal structure of the intermetallic phase in the alloys makes them ideal for metal-to-metal wear applications, because it is much easier to form a smoother worn surface than when using hard, carbide-containing alloys. The smoother worn surface can accommodate higher stress and has less tendency to wear away the mating surfaces. Furthermore, because of the approximately equal distribution of chromium, as shown below, in the intermetallic compounds and the solid solution matrix, oxidation resistance of the inventive alloys is better than carbide-containing tool steels with similar chromium content. A more uniformly distributed chromium in the hard phase and matrix also improves high temperature sliding wear resistance of the preferred alloys because a continuous and uniform oxidation layer is formed on top of the alloys when exposed to high temperatures. Accordingly, this is more effective in reducing direct metal-to-metal wear. Since the matrix of the inventive alloys is strengthened by intermetallic compound precipitation and solid solution hardening mechanisms and, in preferred embodiments, by precipitation hardening involving secondary intermetallic compounds, hot hardness of the inventive alloys is significantly improved over normal martensitic-type iron base alloys.

Examples of alloys of the present invention are described below. The nominal composition of sample alloys Nos. 1–33 (some of which are inventive alloys and some of which are comparative) and four comparative commercial alloys (sample alloys Nos. 34–37) is given in Table 1 below. (Sample alloys Nos. 6–8, 12–14, and 16–29 are examples of different embodiments and aspects of the present invention. The composition of sample alloy No. 6 is repeated several places in the table so that its composition can be easily compared to other sample alloy groups.)

TABLE 1

Alloy Chemical Compositions (wt %)

| Sample Alloy Number | C | Si | Cr | Mo | Fe | Co | Ni | Other |
|---|---|---|---|---|---|---|---|---|
| 1 (comparative) | 0.05 | 2.0 | 8.0 | 15.0 | 75.0 | — | — | |
| 2 (comparative) | 0.05 | 2.0 | 8.0 | 22.0 | 68.0 | — | — | |
| 3 (comparative) | 0.05 | 2.0 | 8.0 | 24.0 | 66.0 | — | — | |
| 4 (comparative) | 0.05 | 2.0 | 8.0 | 26.0 | 64.0 | — | — | |
| 5 (comparative) | 0.05 | 2.0 | 8.0 | 28.0 | 62.0 | — | — | |
| 6 | 0.05 | 2.0 | 8.0 | 30.0 | 60.0 | — | — | |
| 7 | 0.05 | 2.0 | 8.0 | 32.0 | 58.0 | — | — | |
| 8 | 0.05 | 2.0 | 8.0 | 35.0 | 55.0 | — | — | |
| 9 (comparative) | 0.05 | 2.0 | 8.0 | 40.0 | 50.0 | — | — | |
| 10 (comparative) | 0.05 | 0.5 | 8.0 | 30.0 | 61.5 | — | | |
| 11 (comparative) | 0.05 | 1.0 | 8.0 | 30.0 | 61.0 | — | — | |
| 12 | 0.05 | 1.5 | 8.0 | 30.0 | 60.5 | — | — | |
| 6 | 0.05 | 2.0 | 8.0 | 30.0 | 60.0 | — | — | |
| 13 | 0.05 | 2.5 | 8.0 | 30.0 | 59.5 | — | — | |
| 14 | 0.05 | 3.0 | 8.0 | 30.0 | 59.0 | — | — | |

TABLE 1-continued

Alloy Chemical Compositions (wt %)

| | C | Si | Cr | Mo | Fe | Co | Ni | Other |
|---|---|---|---|---|---|---|---|---|
| 15 (comparative) | 0.05 | 4.0 | 8.0 | 30.0 | 58.0 | — | — | |
| 6 | 0.05 | 2.0 | 8.0 | 30.0 | 60.0 | — | — | |
| 16 | 0.05 | 2.0 | 8.0 | 30.0 | 57.0 | 3.0 | — | |
| 17 | 0.05 | 2.0 | 8.0 | 39.0 | 54.0 | 6.0 | — | |
| 18 | 0.05 | 2.Q | 8.0 | 30.0 | 51.0 | 9.0 | — | |
| 19 | 0.05 | 2.0 | 8.0 | 30.0 | 48.0 | 12.0 | — | |
| 20 | 0.05 | 2.0 | 8.0 | 30.0 | 47.0 | 12.0 | 1.0 | |
| 21 | 0.05 | 2.0 | 8.0 | 30.0 | 48.0 | 6.0 | 6.0 | |
| 6 | 0.05 | 2.0 | 8.0 | 30.0 | 60.0 | — | — | |
| 22 | 0.05 | 2.0 | 8.0 | 30.0 | 57.0 | — | 3.0 | |
| 23 | 0.05 | 2.0 | 8.0 | 30.0 | 54.0 | — | 6.0 | |
| 24 | 0.05 | 2.0 | 8.0 | 30.0 | 48.0 | — | 12.0 | |
| 25 | 0.05 | 2.0 | 8.0 | 28.0 | 50.0 | 12.0 | — | |
| 26 | 0.05 | 2.0 | 8.0 | 20.0 | 58.0 | 12.0 | — | |
| 27 (comparative) | 0.05 | 2.0 | 8.0 | 20.0 | 62.0 | 8.0 | — | |
| 28 | 0.05 | 2.0 | 8.0 | 27.0 | 60.0 | — | 3.0 | |
| 29 | 0.05 | 2.0 | 8.0 | 27.0 | 54.0 | 6.0 | 3.0 | |
| 30 (comparative) | 0.05 | 2.0 | 8.0 | 25.0 | 60.0 | — | — | W: 5% |
| 31 (comparative) | 0.05 | 2.0 | 8.0 | 20.0 | 60.0 | — | — | W: 10% |
| 32 (comparative) | 0.05 | 2.0 | 8.0 | 20.0 | 50.0 | — | — | W: 20% |
| 33 (comparative) | 0.05 | 2.0 | 8.0 | 5.0 | 60.0 | — | — | W: 25% |
| Commercial Alloy Number (Trade Name) | | | | | | | | |
| 34 (Tribaloy ® T400) | 0.08 | 2.6 | 8.5 | 28.5 | — | 60.4 | — | |
| 35 (Tribaloy ® T800) | 0.08 | 3.4 | 17.5 | 28.5 | — | 50.6 | — | |
| 36 (Stellite ® 3) | 2.4 | — | 30 | — | 2.0 | 50.8 | 2.0 | 12.8 (W) |
| 37 (M2 tool steel) | 1.6 | 1.30 | 0.50 | 4.0 | 6.5 | 79.1 | — | 5.5 (W) 1.5 (V) |

Sample alloys Nos. 1–9 contain 0.05 wt % C, 2.0 wt % Si, 8.0 wt % Cr, 15.0–40.0 wt % Mo, and the balance being iron with a small amount of impurities. Sample alloys Nos. 10–15 have compositions of 0.05 wt % C, 8.0 wt % Cr, 30.0 wt % Mo, 0.54.0 wt % Si, and the balance being iron with a small amount of impurities. Sample alloys Nos. 16–21 contain 0.05 wt % C, 2.0 wt % Si, 8.0 wt % Cr, 30.0 wt % Mo, 3.0–12.0 wt % Co, and the balance being iron with a small amount of impurities. Sample alloy No. 20 also contains 1.0 wt % Ni and sample alloy No. 21 contains 6.0 wt % Co and 6.0 wt % Ni. Sample alloys Nos. 22–24 contain 0.05 wt % C, 2.0 wt % Si, 8.0 wt % Cr, 30.0 wt % Mo, 3.0–12.0 wt % Ni, and the balance being Fe and a small amount of impurities. Sample alloys Nos. 25–29 contain 0.05 wt % C, 2.0 wt % Si, 8.0 wt % Cr, 20.0–28.0 wt % Mo, 0–12.0 wt % Co, 0–3.0 wt % Ni, and the balance being Fe and a small amount of impurities. Sample alloys Nos. 30–33 contain 0.05 wt % C, 2.0 wt % Si, 5.0–25.0 wt % Mo, 5.0–25.0 wt % W, and the balance being iron and a small amount of impurities. Sample alloys Nos. 34–37 are commercially available alloys. Specimens of the above sample (inventive and comparative) and commercial alloys were cast and machined for hot hardness and wear tests.

A high temperature pin-on-disk wear tester was used to measure the sliding wear resistance of the alloys, because sliding wear is the common wear mode in valve seat inserts wear due to the relative sliding motion of valve against valve seat inserts in internal combustion engines. The pin specimens were made with dimensions of 6.35 mm diameter and approximate 25.4 mm length out of Eatonite 6 alloy from the Eaton Corporation of Marshall, Ml, which nominal contains 1.30% C, 1.42% Si, 29.0% Cr, 4.6% Mo, 0.5% Mn, 16.0% Ni and the balance iron. The disk specimens were made of sample alloys having dimensions of 50.8 mm in diameter and in 12.5 mm in thickness. The tests were performed with reference to ASTM G99–90 at 800° F. (427° C.). The disk was rotated at a velocity of 0.13 m/s for a total sliding distance of 510 m. The applied pressure was 5.0 psi ($3.52 \times 10^{-3}$ Kg/mm$^2$). This speed was chosen because it is believed to give wear test results that have a good correlation to valve seat wear in a typical internal combustion engine. The weight loss was measured on both the pin and the disk samples after each test using a balance with 0.1 mg precision. Eatonite 6 was used as the pin alloy because it is a common valve facing alloy. In addition to the sample alloys, Tribaloy® T400, T700, and T800 were tested as standard wear resistant alloys in the wear tests. Table 2 includes the disk weight loss results of wear tests performed on the cast and machined sample alloys and the commercial alloys. The weight loss of a material after a wear test is a measure of the wear resistance of the testing material: the lower the weight loss of the material, the higher the wear resistance. When tested under the above conditions, alloys of the present invention will preferably have a loss of less than 50 milligrams.

TABLE 2

Wear Test Results

| Sample Alloy | (Weight Loss, mg) | Sample Alloy | (Weight Loss, mg) |
|---|---|---|---|
| 1 (Mo 15%) | 409.8 | 6 (Mo 30%, Ni 0%) | 43.2 |
| 2 (Mo 22%) | 351.9 | 22 (Mo 30%, Ni 3%) | 20.5 |
| 3 (Mo 24%) | 169.7 | 23 (Mo 30%, Ni 6%) | 21.4 |
| 4 (Mo 26%) | 156.4 | 24 (Mo 30%, Ni 12%) | 16.6 |
| 5 (Mo 28%) | 70.2 | 25 (Mo 28%, Co 12%) | 11.8 |
| 6 (Mo 30%) | 43.2 | 26 (Mo 20%, Co 12%) | 21.3 |
| 7 (Mo 32%) | 28.2 | 27 (Mo 20%, Co 8%) | 203.2 |
| 8 (Mo 35%) | 21.8 | 28 (Mo 27%, Ni 3%) | 31.1 |
| 9 (Mo 40%) | 60.3 | 29 (Mo 27%, Co 6%, Ni 3%) | 13.6 |
| 10 (Si 0.5%) | 235.8 | 30 (Mo 25%, W 5%) | 71.0 |
| 11 (Si 1.0%) | 159.7 | 31 (Mo 20%, W 10%) | 590.6 |
| 12 (Si 1.5%) | 35.4 | 32 (Mo 20%, W 20%) | 200.8 |

TABLE 2-continued

Wear Test Results

| Sample Alloy | (Weight Loss, mg) | Sample Alloy | (Weight Loss, mg) |
|---|---|---|---|
| 6 (Si 2.0%) | 43.2 | 33 (Mo 5%, W 25%) | 451.8 |
| 13 (Si 2.5%) | 33.3 | 34 (Tribaloy T400) | 20.8 |
| 14 (Si 3.0%) | 42.4 | 35 (Tribaloy T800) | 16.6 |
| 15 (Si 4.0%) | 55.5 | 26 (Mo 20%, Co 12%) | 21.3 |
| 6 (Mo 30%, Co 0%) | 43.2 | 26*(Mo 20%, Co 12%) | 9.5 |
| 16 (Mo 30%, Co 3%) | 26.9 | | |
| 17 (Mo 30%, Co 6%) | 16.2 | | |
| 18 (Mo 30%, Co 9%) | 12.3 | | |
| 19 (Mo 30%, Co 12%) | 8.0 | | |
| 20 (Mo 30%, Co 12%, Ni 1%) | 8.9 | | |
| 21 (Mo 30%, Co 6%, Ni 6%) | 8.9 | | |

26*: precipitation hardened at 800° F. (427° C.) for 6 hours.

Molybdenum is one of the most important elements in the inventive alloys, as it determines the amount of intermetallic compounds that have a critical influence on the wear resistance on the invented alloys. Sample alloys Nos. 1–9 contain different amounts of molybdenum. The effect of molybdenum on wear resistance of the alloys can be seen from the wear test data summarized in Table 2. The wear test results for sample alloys Nos. 1–5 shows that wear resistance increases with increasing molybdenum content when molybdenum is in the 15–28 wt % range (Table 2). However, these sample alloys are still not as wear resistant as the comparative Tribaloy® alloys, commercial alloys Nos. 34–35. A significant improvement of the wear resistance occurs when molybdenum exceeds 28 wt %, where the wear loss is closer to that of the commercial alloys, alloys No. 34–35. Hence, to achieve excellent wear resistance, molybdenum must be equal to or greater than 29 wt % in the inventive alloy when there is no cobalt or nickel added to the alloy. Further increasing molybdenum content to 40 wt % causes a severe cracking problem in castings, and higher molybdenum (40 wt %) does not provide any further wear resistance (Table 2). Therefore, the optimum molybdenum for the inventive alloys is in a narrow range of 30 to 35 wt % as supported by the wear test results. More or less molybdenum beyond the specified range deteriorates wear resistance of the alloys or causes manufacturing problems.

Silicon is another important element affecting wear resistance of the inventive alloys. Sample alloys Nos. 10–15 with seven different silicon contents were used to determine the optimal silicon range for the inventive alloys. As indicated in Table 2, sample alloys Nos. 10–11, with a silicon content between 0.5 wt % and 1.0 wt %, have poor wear resistance. Sample alloys with 1.5 wt %, 2.0 wt %, and 2.5 wt % silicon demonstrate excellent wear resistance. However, as silicon content in the alloys exceeds 3.0 wt %, wear resistance of the inventive alloys decrease (sample alloys Nos. 14–15). Higher silicon content also causes castings made of the alloys to be extremely brittle. Thus, the optimum silicon range of the inventive alloys is between 1.5 wt % and 3.0 wt %; more preferably between 1.5 wt % and 2.5 wt %.

Tungsten and molybdenum are two refractory elements that are generally believed to be interchangable as to their effects on the properties of tool steels. However, the present inventors found that molybdenum is much more effective than tungsten in improving the wear resistance of the inventive alloys. Wear tests for sample alloys No. 30–33, in which molybdenum is partially replaced by tungsten with 5.0 wt %, 10.0 wt %, 20.0 wt %, and 25.0 wt % compared to sample alloy No. 6, show that wear resistance is much worse when tungsten replaces molybdenum. Therefore, tungsten is not considered to be interchangeable with molybdenum in the present invention, and is preferably limited to less than 5 wt % to obtain the maximum wear resistance in the alloys.

Current experimental study indicates that additions of cobalt and/or nickel to the inventive alloys can greatly increase the high temperature wear resistance of the alloys. Sample alloys Nos. 22–24 with 3.0 wt %, 6.0 wt %, and 12.0 wt % nickel show significant improvement of wear resistance over sample alloy No. 6, where the nickel content is zero (Table 2). Sample alloys Nos. 16–19 contains 3.0 wt %, 6.0 wt %, 9.0 wt % and 12.0 wt % cobalt. The wear test results show that the wear resistance of the sample alloys Nos. 16–19 is much better than that of sample alloy No. 6, where cobalt content is zero. The wear resistance also increases with the increase of cobalt content in the alloys from zero to 12.0 wt % (Table 2) according to the tests. Sample alloys Nos. 20–21 contain both cobalt and nickel elements. The wear resistance of these two sample alloys is also better than sample alloy No. 6, where cobalt and nickel content are zero. Table 2 also shows that the wear resistance of sample alloys containing some cobalt and/or nickel elements, such as sample alloys Nos. 19–21, is better than the much more expensive cobalt base commercial alloys (Nos. 34–35).

As indicated in the previous sections, molybdenum content must be in the range of 30 wt % to 35 wt % to achieve good wear resistance in one aspect of the inventive alloys, and additions of cobalt and/or nickel can further increase the wear resistance of the inventive alloys. However, it is desirable to use lower molybdenum content for better machining properties and better ductility for other aspects of the inventive alloys. Sample alloys Nos. 25–29 contain 20.0 to 28.0 wt % of molybdenum with various amounts of cobalt and/or nickel elements. Sample alloys Nos. 25, 28 and 29 contain 27.0–28.0 wt % molybdenum with at least 3.0 wt % of cobalt and/or nickel elements, and these example alloys have better wear resistance than that of sample alloy No. 6. Furthermore, the test results indicate that molybdenum content can be even lower, down to 20 wt %, with the addition of 12 wt % cobalt. The wear resistance of sample alloy No. 26 is better than that of sample alloy No. 6 containing 30.0 wt % molybdenum (Table 2). Less cobalt will result in a decrease of wear resistance in the alloys as shown in sample alloy No. 27 with 20.0 wt % molybdenum and 8.0 wt % cobalt elements in which the wear resistance is much worse than that of sample alloys No. 25 (Table 2).

Valve seat insert wear caused by repeated indentations is another common wear mode in many internal combustion engines. Increasing the hardness of valve seat insert alloys can effectively reduce this type of wear.

Using electrochemical extraction technique to separate the hard phase from the matrix of sample 25, the structures of the hard phase were identified by the X-ray diffraction method. It was found that two types of intermetallic compounds exist in the sample of the inventive alloy, $Fe_2Mo$ and $Fe_{63}Mo_{37}$. The amount of $Fe_2Mo$ is slightly higher than the amount of $Fe_{63}Mo_{37}$. The chemical compositions of the hard phase were determined by energy dispersive spectroscopy analysis under a scanning electron microscope. The hard phase was found to contain 38.8% Mo, 42.1% Fe, 7.0% Cr, 9.3% Co, 2.6% Si, and other trace elements. The hardness of the hard phase in the inventive alloys is in the range of 1100 to 1400 $kg/mm^2$ measured by a Knoop type microhardness tester under a 50 gram load.

Hot hardness was measured for several sample alloys and three commercially available alloys in a Vickers type hardness tester at various temperatures. Ring specimens with a 45 mm outer diameter, a 32 mm inner diameter, and a 5 mm thickness were used as hot hardness specimens.

All specimens were ground using Nos. 180, 400 and 600 SiC sand papers, then polished with 6 μm diamond paste and 0.02 μm alumina slurry respectively. The specimen and the indenter were kept at the desired temperature for 30 minutes under argon atmosphere to ensure uniform temperature in both the specimen and indenter. The Vickers indenter is made of sapphire with a 136 degree face angle. According to ASTM Standard Test Method E92-82, 10–15 indentation tests were made along each ring specimen surface. The two indentation diagonals of each indentation were measured using a filar scale under a light microscope and the values converted to a Vickers hardness number using ASTM E140-78 Standard Hardness Conversion Tables for Metals. The average hardness of the specimens at the various temperatures are given as converted to Rockwell C hardness.

Figure 2:
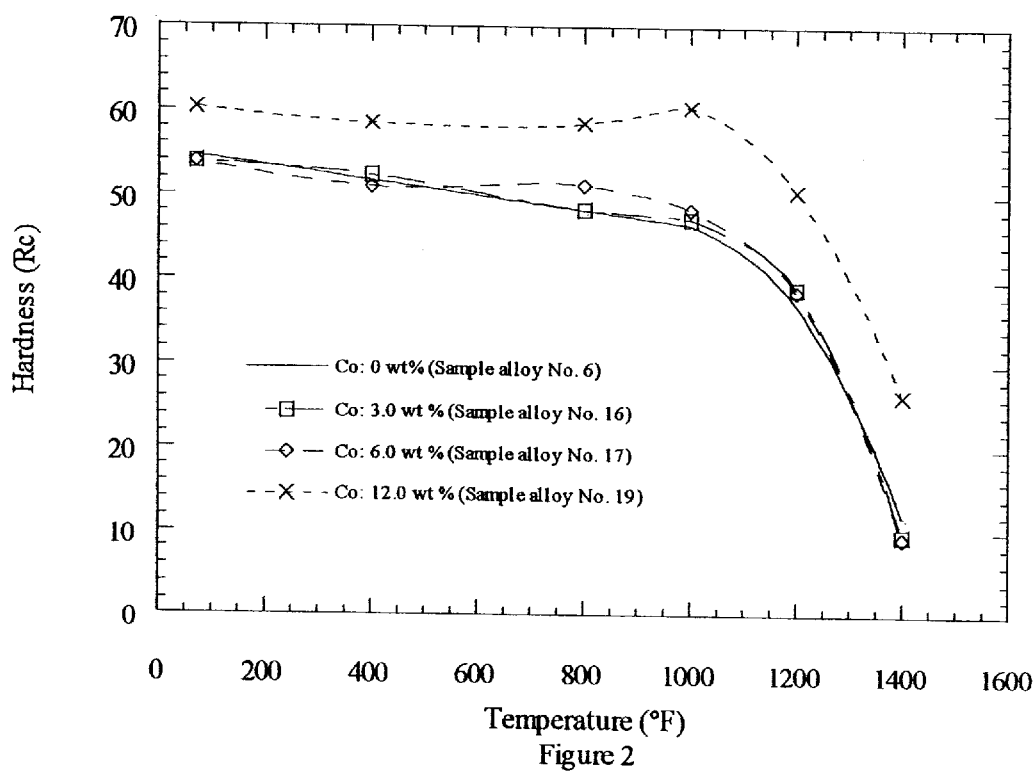
FIG. 2 is a graph showing the effect of cobalt content on hot hardness of sample alloys of the invention.

FIGS. 1 and 2 show the effects of nickel and cobalt additions on the hot hardness of this type of alloy. In the temperature range of room temperature to 800° F. (427° C.), FIG. 1 shows that the addition of 3.0 wt % nickel increases hardness about 2 points in Rockwell C scale compared to the same alloy with no nickel. The addition of 6.0 wt % nickel has little effect on hot hardness of the alloy. When nickel content reaches 12.0 wt %, the whole hardness-temperature curve shifts downward because of the softer austenitic matrix formed, as shown for sample alloy No. 24. Thus, it can be concluded that nickel has little contribution to the hot hardness of the alloy even when the amount of nickel is high enough to transform the matrix into an austenitic type structure.

FIG. 2 illustrates the effects of cobalt on the hot hardness of the alloys containing intermetallics. Cobalt additions of 3.0 wt % and 6.0 wt % have little effect on the hardness-temperature curve. However, as the cobalt content increased to 12.0 wt %, hardness of the alloy is significantly increased over the tested temperature range.

Figure 3:
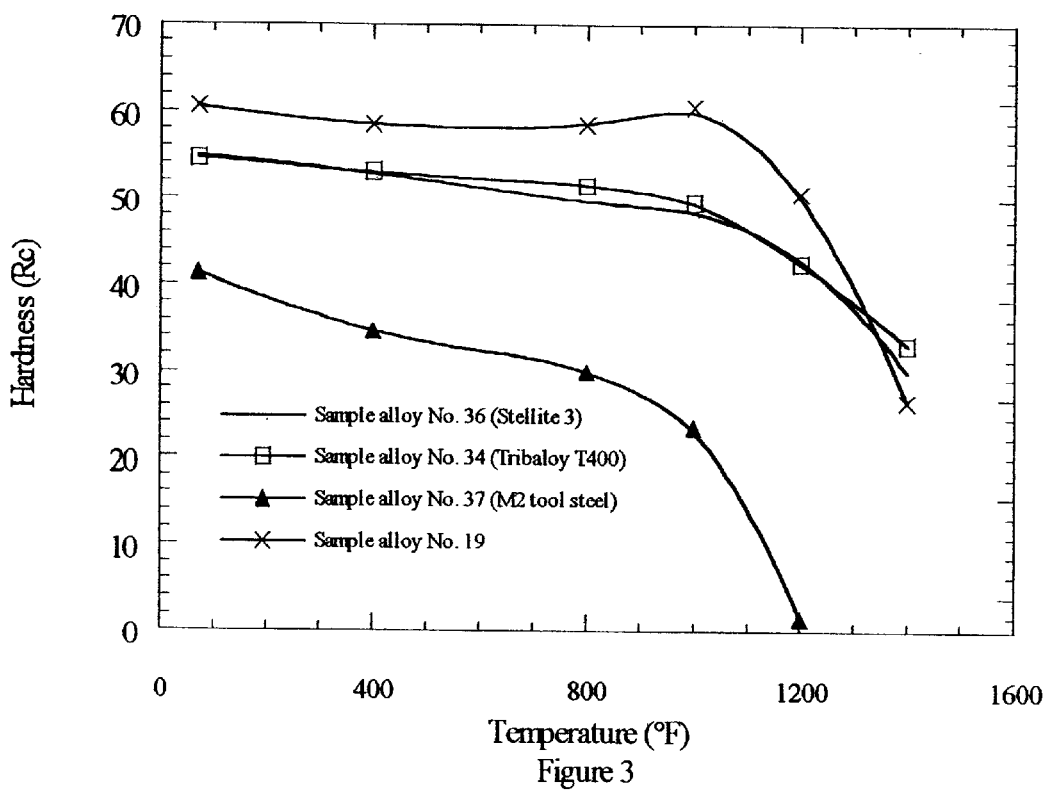
FIG. 3 is a graph showing the hot hardness of a sample alloy of the invention compared to several commercially available alloys.

FIG. 3 compares the hot hardness curves of several commercial alloys with the hot hardness curves of the inventive alloys. It is clear that the hot hardness properties of the inventive alloys show a significant improvement over M2 tool steel in the tested temperature range. It is also clear that the hot hardness values of the inventive alloys are higher than Stellite® 3 and Tribaloy® T400 at temperature below 1200° F. (649° C.), which is much higher than the average exhaust working temperature of valve seat inserts.

While wear resistance is the most important property of the inventive alloys, it is preferred that the alloys have an as cast hardness at room temperature of at least 45 on a Rockwell C scale.

Unfortunately, increasing hardness will inevitably increase the machining difficulties, especially for most wear-resistant cast valve seat insert alloys in which the machining ability is already very poor. One solution to the problem would be an alloy with low temperature precipitation hardening ability, so that the hardness of the finished valve seat insert will increase after being exposed to typical exhaust working temperatures. Normally steel has to be heated to about 1400–1500° F. (760–816° C.) and then quenched to produce such hardening. A unique feature of the preferred inventive alloys is that the hardness of the alloys can increase significantly when exposed to temperatures in the range of 800° F. (427° C.) and greater, and without quenching. This is especially beneficial to improve the service life of valve seat inserts, since the working temperatures of exhaust valve seat inserts are generally around 800° F. (427° C.), and can be as high as 1000° F. (538° C.) in severe applications.

This self-hardening feature is achieved through carefully controlling the amounts of cobalt and nickel in the alloys to promote precipitation of secondary intermetallic compounds. Sample alloys No. 16 to 28 have different amounts of cobalt and/or nickel content. Most of these alloys and two commercially available alloys were tested with a Rockwell C type hardness tester using ASTM Standard Test Method E18-59T at room temperature and after being heated at 800° F. (427° C.) for two hours and cooled to room temperature. The average hardness of the specimens and the differences (hardness change) are reported in Table 3, which is a summary of the precipitation hardening results at 800° F. (427° C.) for two hours.

TABLE 3

Low temperature hardening test results (2 hours)

| Sample Alloy | Hardness at Room Temp. (Rc) | Hardness after precipitation treatment (Rc) | Hardness Change (Rc) |
| --- | --- | --- | --- |
| 6 (Mo 30%, Co 0%, Ni 0%) | 50.5 | 51.6 | 1.1 |
| 16 (Mo 30%, Co 3%, Ni 0%) | 51.8 | 53.0 | 1.2 |
| 17 (Mo 30%, Co 6%, Ni 0%) | 53.7 | 55.2 | 1.5 |
| 18 (Mo 30%, Co 9%, Ni 0%) | 58.3 | 63.6 | 5.3 |
| 19 (Mo 30%, Co 12%, Ni 0%) | 60.8 | 67.6 | 6.8 |
| 20 (Mo 30%, Co 12%, Ni 1.0%) | 54.9 | 56.4 | 1.5 |
| 27 (Mo 20%, Co 8%, Ni 0%) | 45.0 | 46.9 | 1.9 |
| 26 (Mo 20%, Co 12%, Ni 0%) | 53.3 | 62.7 | 9.4 |
| 22 (Mo 30%, Co 0%, Ni 3%) | 54.3 | 54.0 | −0.3 |
| 23 (Mo 30%, Co 0%, Ni 6%) | 54.0 | 54.2 | 0.2 |
| 24 (Mo 30%, Co 0%, Ni 12%) | 47.3 | 47.4 | 0.1 |
| 34 (Tribaloy ® T400) | 53.1 | 53.0 | −0.1 |
| 35 (Tribaloy ® T800) | 56.0 | 55.3 | −0.7 |

It is clear that when cobalt content is equal to or less than 8.0 wt %, little precipitation hardening was observed, as shown in sample alloys Nos. 6, 16 and 17, in which the highest hardness gain is less than 1.9 Rc. As the cobalt content increases to 9.0 wt % (sample alloy No. 18), the precipitation hardening effect becomes more obvious, and using 12.0 wt % cobalt results in an alloy (sample alloy No. 19) that had an increase in its hardness by nearly 7 points in Rockwell C scale compared to its original hardness. Sample alloy No. 26, also with 12.0 wt % cobalt but with a lower molybdenum content, had an even higher precipitation hardening effect; its hardness increased by about 9 points in Rockwell C. Its wear resistance also increased substantially as shown for sample alloy No. 26 with precipitation treatment in Table 2.

Addition of nickel (sample alloys No. 22–24) virtually eliminates any hardening effects in the alloys. In fact, even 1.0 wt % nickel can reduce the hardening effect promoted by the addition of cobalt (sample alloy No. 20). Thus, nickel content should be limited to 0.5 wt % and cobalt should exceed 6.0 wt % in order to get the desirable hardening effect in the inventive alloys that will be used at temperatures above 600° F. (318° C.). Preferably the total of molybdenum and cobalt will exceed 28% for these types of alloys.

The oxidation resistance of the inventive alloys was determined using the weight gain method. The size of the oxidation specimen was 12.7 mm in diameter and 25.4 mm in length. The specimens were cleaned in an ultrasonic cleaner containing alcohol. Each specimen was kept in a magnesia crucible and placed in a furnace at 800° F. (427° C.). The specimens with crucibles were cooled to room temperature in a desiccator to keep the specimens from absorbing moisture. The weight of the specimen and the crucible were measured using a balance with precision of 0.1 mg. This process was repeated at certain intervals to measure the oxidation rate. The average oxidation rate for a 500 hour test is given in Table 4.

TABLE 4

| Alloy | Average Oxidation rate $10^{-3}$ (g/m² · hr.) |
|---|---|
| Sample No. 6 | 1.3508 |
| M2 tool steel | 6.7653 |

It is clear that the oxidation rate of the inventive alloy is much lower than that of M2 tool steel. The ratio of the oxidation rate of the two materials is about 1:5. The good oxidation resistance of the inventive alloys is due to the fact that a higher chromium content is approximately evenly partitioned between the hard phases and matrix of the inventive alloys, forming a continuous protective film when exposed to high temperature environments. This also improves the sliding wear resistance of the alloys as indicated previously. Therefore, the inventive alloys are more suitable for high temperature wear resistant applications than common tool steels. It is expected that cobalt base alloys like Stellite® 3 and Tribaloy® T800 would only produce a negligible amount of weight change in the present oxidation condition due to their excellent oxidation resistance; thus, oxidation tests were not run on these alloys.

To summarize, the alloys of the present invention all have less than about 0.1 wt % carbon; between about 1.5 and about 3 wt %, preferably between about 1.5 and about 2.5 wt % silicon; and about 6 to about 15 wt %, preferably about 6 to about 10 wt % chromium. When the alloys are to be used in applications where the working temperatures are above 600° F. (318° C.) but not above 1000° F. (538° C.) the alloys will have between about 18 and about 32 wt %, and preferably between about 26 and about 32 wt % molybdenum; between about 8 and about 15 wt % and preferably between about 10 and about 14 wt % cobalt and less than about 0.5 wt % nickel. When the alloys will be used in applications with expected temperatures of less than 600° F. (318° C.) the molybdenum will be between about 29 and about 36 wt %, more preferable between about 29 and about 31 wt %; the cobalt will be between 0 and about 15 wt %, more preferable between 0 and about 12 wt %; and the nickel will be between 0 and about 14 wt %. When the alloy is to be used at temperatures over 1000° F. (518° C.), the molybdenum will be between about 26 and about 36 wt %, and the nickel will be between about 3 and about 14 wt %. If cobalt is used it will be less than about 15 wt %, more preferably less than 12 wt %. Regardless of the application, the alloys will comprise at least 40% iron, and more preferably at least 45% iron. Most preferably the balance of the alloy will be iron, with tolerance of the normal impurities typically associated with iron base alloys.

It should be appreciated that the alloys of the present invention are capable of being incorporated in the form of a variety of embodiments, only a few of which have been illustrated and described. The invention may be embodied in other forms without departing from its spirit or essential characteristics. It should be appreciated that the addition of some other ingredients, process steps, materials or components not specifically included will have an adverse impact on the present invention. The best mode of the invention may, therefore, exclude ingredients, process steps, materials or components other than those listed above for inclusion or use in the invention. However, the described embodiments are considered in all respects only as illustrative and not restrictive, and the scope of the invention is, therefore, indicated by the appended claims rather than by the foregoing description. All changes that come within the meaning and range of equivalency of the claims are to be embraced within their scope.

What is claimed is:

1. A homogeneous iron base alloy with precipitation hardening ability at low temperature, possessing good hot hardness and excellent wear resistance, comprising:
    a) less than 0.1 wt % carbon;
    b) about 6 to about 15 wt % chromium;
    c) at least 1.5 to about 3 wt % silicon;
    d) about 8 to about 15 wt % cobalt;
    e) about 18 to about 32 wt % molybdenum, the amount of molybdenum and cobalt together being greater than 28 wt %;
    f) less than 0.5 wt % nickel; and
    g) at least about 40 wt % iron.

2. A part for an internal combustion engine component comprising the alloy of claim 1.

3. The part of claim 2 where the part is formed by casting the alloy, hardfacing with the alloy either in wire or powder form, or the part is formed by a powder metallurgy method.

4. The alloy composition of claim 1 wherein the amount of molybdenum is between about 26 and about 32 wt %.

5. The alloy composition of claim 1 wherein the amount of chromium is between about 6 and about 10 wt %.

6. The alloy composition of claim 1 wherein the amount of silicon is between about 1.5 and about 2.5 wt %.

7. The alloy composition of claim 1 wherein the amount of cobalt is between about 10 and about 14 wt %.

8. The alloy composition of claim 1 wherein the amount of iron is greater than about 45 wt %.

9. A homogenous iron base alloy possessing good hot hardness and excellent wear resistance, comprising:
    a) less than about 0.1 wt % carbon;
    b) about 6 to about 15 wt % chromium;
    c) about 1.5 to about 3 wt % silicon;
    d) about 29 to about 36 wt % of molybdenum;
    e) about 0 to about 15 wt % cobalt;
    f) about 0 to about 14 wt % nickel;
    g) at least about 40 wt % iron; and
    h) wherein the alloy contains at least one of nickel or cobalt, the total amount of nickel and cobalt being greater than 3 wt % but not more than 15 wt %.

10. A part for an internal combustion engine component comprising the alloy of claim 9.

11. The part of claim 10 where the part is formed by casting the alloy, hardfacing with the alloy either in wire or powder form, or the part is formed by a powder metallurgy method.

12. The alloy composition of claim 9 wherein the amount of molybdenum is between about 29 and about 31 wt %.

13. The alloy composition of claim 9 wherein the amount of chromium is between about 6 and about 10 wt %.

14. The alloy composition of claim 9 wherein the amount of silicon is between about 1.5 and about 2.5 wt %.

15. The alloy composition of claim 9 wherein the amount of iron is greater than about 45 wt %.

16. A homogeneous iron base alloy possessing good hot hardness and excellent wear resistance, compromising:
   a) less than about 0.1 wt % carbon;
   b) about 6 to about 15 wt % chromium;
   c) about 1.5 to about 3 wt % silicon;
   d) about 26 to about 36 wt % molybdenum;
   e) about 0 to about 15 wt % cobalt;
   f) about 3 to about 14 wt % nickel; and
   g) at least about 40 wt % iron.

17. The alloy of claim 1 wherein the alloy has a high temperature, pin-on-disc sliding wear resistance, measured using ASTM 699-90 at 800° F. (427° C.), at 0.13 m/s for 510 m, of less than 50 milligrams.

18. The alloy of claim 1 wherein tungsten comprises less than about 5 wt % of the alloy.

19. The alloy of claim 1 wherein the alloy has a hardness at room temperature of at least 45 on a Rockwell C scale.

20. A homogenous iron base alloy possessing good hot hardness and excellent wear resistance, comprising:
   a) less than about 0.1 wt % carbon;
   b) about 6 to about 15 wt % chromium;
   c) about 1.5 to about 3 wt % silicon;
   d) about 32 to about 35 wt % of molybdenum;
   e) less than about 0.5 wt % cobalt;
   f) less than about 0.5 wt % nickel; and
   g) at least about 40 wt % iron.

* * * * *

UNITED STATES PATENT AND TRADEMARK OFFICE
CERTIFICATE OF CORRECTION

PATENT NO.    : 6,485,678 B1
DATED         : November 26, 2002
INVENTOR(S)   : Xuecheng Liang et al.

It is certified that error appears in the above-identified patent and that said Letters Patent is hereby corrected as shown below:

<u>Title page,</u>
Item [56], U.S. PATENT DOCUMENTS, delete "Fuiki et al." and substitute
-- Fujiki et al. -- in its place.

<u>Column 13,</u>
Line 13, delete "699-90 at 800° F. (427°C.)," and substitute
-- G99-90 at 800° F (427°C.), -- in its place.

Signed and Sealed this

First Day of July, 2003

JAMES E. ROGAN
*Director of the United States Patent and Trademark Office*